United States Patent [19]

Kinoshita et al.

[11] 4,261,862

[45] Apr. 14, 1981

[54] CATALYST FOR PURIFYING EXHAUST GAS AND A PROCESS FOR MANUFACTURING THEREOF

[75] Inventors: Hiroo Kinoshita; Yoshihiro Suzuki, both of Toyota, Japan

[73] Assignee: Toyota Jidosha Kogyo Kabushiki Kaisha, Toyota, Japan

[21] Appl. No.: 90,992

[22] Filed: Nov. 5, 1979

[30] Foreign Application Priority Data

Jul. 6, 1979 [JP] Japan ................................ 54-85668

[51] Int. Cl.$^3$ ..................... B01J 21/04; B01J 23/10; B01J 23/42; B01J 23/44
[52] U.S. Cl. ................................ 252/462; 252/465; 252/466 B; 252/466 PT; 423/213.5
[58] Field of Search ................... 252/462, 465, 466 B, 252/466 PT; 423/213.5

[56] References Cited

U.S. PATENT DOCUMENTS

| | | | |
|---|---|---|---|
| 3,189,563 | 6/1965 | Hauel | 252/460 |
| 3,565,830 | 2/1971 | Keita et al. | 252/466 PT |
| 3,741,725 | 6/1973 | Graham | 252/466 PT |
| 3,791,992 | 2/1974 | Feldwick | 252/463 |
| 4,049,582 | 9/1977 | Erickson et al. | 252/466 PT |
| 4,172,810 | 10/1979 | Mitchell et al. | 252/468 X |

*Primary Examiner*—W. J. Shine
*Attorney, Agent, or Firm*—Oblon, Fisher, Spivak, McClelland & Maier

[57] ABSTRACT

A catalyst for the purification of exhaust gases, comprising:
an active component of Pt, Pd or mixtures thereof deposited on a catalyst support of a carrier coated with a metal oxide having a spinel structure of the formula: $MAl_2O_4$ wherein M is Sr, Mg, Cu, Mn, Mo, Zn, Fe, Ni or Co.

The active component of the catalyst can optionally contain cerium.

15 Claims, 1 Drawing Figure

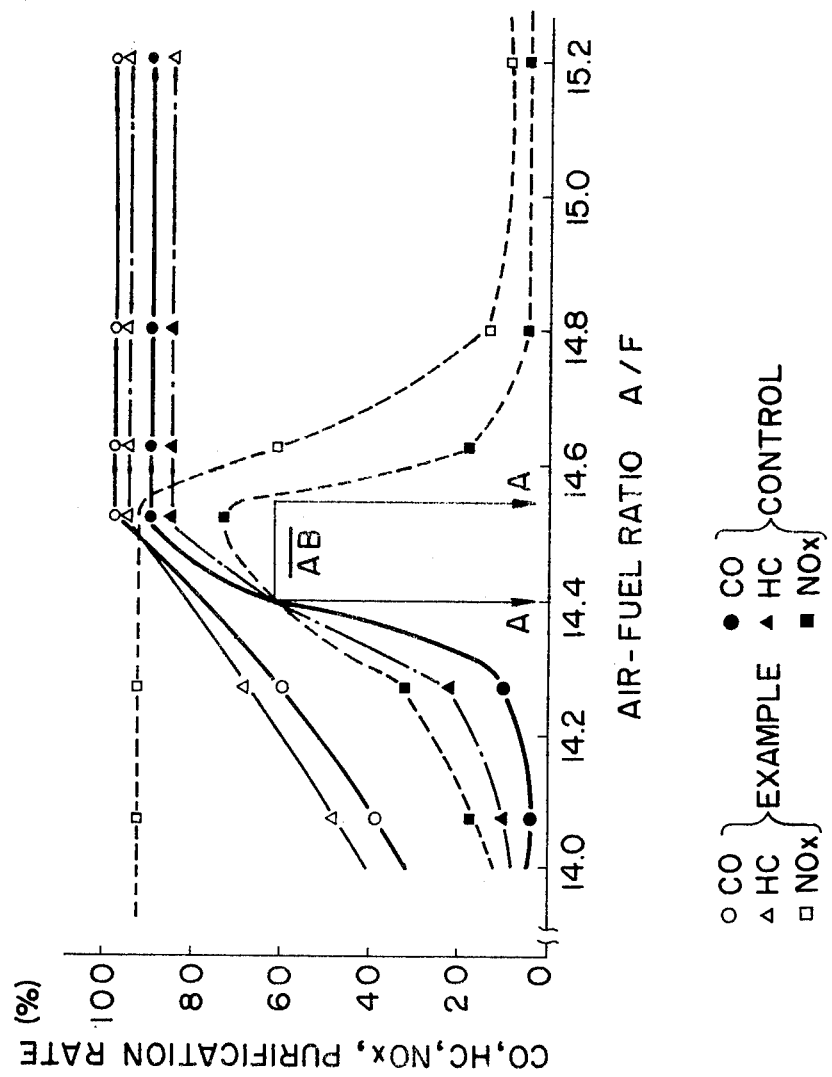

CATALYST FOR PURIFYING EXHAUST GAS AND A PROCESS FOR MANUFACTURING THEREOF

BACKGROUND OF THE INVENTION

1. Field of the Invention

The present invention relates to a supported catalyst useful in the catalytic purification of exhaust gases.

2. Description of the Prior Art

The catalysts which are used for the purification of exhaust gases discharged from an automible internal combustion engine and the like must be highly reactive over a wide range of temperatures because the catalysts are subjected to service conditions in which the chemical reaction-governing factors such as the volume and concentration of reactants or the working temperature cannot be maintained constant.

One general type of supported catalyst system which is useful for the purification of exhaust gases is composed of a catalyst carrier coated with an active substance and further coated with a catalytic material. In one embodiment of this type of catalyst a thin film of active alumina (principally γ-alumina) with a large surface area has been employed as the active substance. However, γ-alumina is susceptible to changes in crystal structure over long service lives at high temperatures. The changes which occur result in a decrease of specific surface area, substantial loss of catalytic activity with the passage of time and loss in durability. Moreover, γ-alumina reacts with such catalyst poisons as compounds of lead, sulfur and phosphorous which are present in the exhaust gas. Thus γ-alumina is not always a satisfactory catalyst component in terms of antitoxicity effects. Moreover, for a catalyst which is formed from an oxide of a metal such as nickel, iron or mixtures thereof supported as the catalytic substance on γ-alumina, long service life of the catalyst at high temperatures causes the metal oxides to react with γ-alumina, resulting in deterioration of catalyst activity. Therefore, a need continues to exist for a catalyst system of improved durability and service life for the purification of exhaust gases discharged from the internal combustion engine.

SUMMARY OF THE INVENTION

Accordingly, one object of the present invention is to provide a catalyst having high performance and high durability characteristics for the purification of exhaust gases.

Another object of the present invention is to provide a catalyst which efficiently eliminates harmful components of exhaust gases which include carbon monoxide, unburned hydrocarbons and nitrogen oxides.

Briefly, these objects and other objects of the present invention as hereinafter will become more readily apparent can be attained by a catalyst system for the purification of exhaust gases composed of an active component of Pt, Pd or mixtures thereof deposited on a catalyst support of a carrier coated with a metal oxide having a spinel structure of the formula: $MAl_2O_4$ wherein M is Sr, Mg, Cu, Mn, Mo, Zn, Fe, Co or Ni. In another embodiment of the catalyst, the active component further comprises cerium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein the FIGURE is a diagram illustrating the purification performances of the catalysts of Example No. 4 and control No. 4.

DETAILED DESCRIPTION OF THE PREFERRED EMBODIMENTS

The present invention represents an improvement over prior art catalysts in exhaust gas purification not only with regard to improved performance and durability, but also with respect to the method of manufacture of the catalyst.

It has now been found that a catalyst system of excellent performance and durability for the purification of exhaust gas can be formulated by coating a metal oxide having a spinel structure of the formula: $MAl_2O_4$ wherein M is selected from the group of Sr, Mg, Cu, Mn, Mo, Zn, Fe, Co and Ni, on a catalyst carrier and then further coating the coated carrier with platinum, palladium or mixtures thereof, optionally with Ce if desired. In another embodiment of the present catalyst system, the catalyst carrier is coated with the spinel oxide and a metal oxide of Al, Sr, Mg, Cu, Mn, Mo, Zn, Fe, Co, or Ni (hereinafter referred to as a metal M oxide), wherein the amount of spinel oxide in the surface film on the catalyst carrier desirably accounts for more than 90 weight % of the total coating and the amount of metal M oxide component accounts for less than 10 weight % of the total coating. This embodiment of the coated catalyst carrier is highly effective for simultaneously eliminating the harmful components present in the exhaust gas discharged from an internal combustion engine working at an air fuel ratio (A/F) of 13.5–15.5 (A/F = ratio by weight of air to fuel supplied into the engine).

The coated catalyst support can be prepared as follows. Distilled water and, if necessary, 0.1–10 weight % of $Al(NO_3)_3.9H_2O$ are added in admixture with alumina sol containing 5–20 weight % of alumina stabilized with an inorganic or organic acid. A fine powder of a metal oxide having the spinel structure preliminarly treated with an inorganic or organic acid is added to the obtained alumina sol, thereby yielding a spinel slurry containing 20–60 weight % of the spinel component.

The metal oxide of spinel structure discussed above can be prepared by an ordinary or conventional process as follows: For example, a powdered oxide of metal M and alumina powder are blended together and calcined at 1200°–1600° C. In the preparative technique the powdered alumina and metal M oxide should desirably have an average particle size of 0.5–25μ. Moreover, the powdered spinel metal oxide product obtained should be desirably crushed to an average particle size of 0.5–25μ. If a spinel oxide powder of an average particle size less than 0.5μ or more than 25μ is coated on the carrier surface, the resulting film will be very weak.

The finely powdered spinel metal oxide thus prepared is washed with a suitable inorganic acid such as nitric acid or hydrochloric acid or with a suitable organic acid such as acetic acid, and then further washed with distilled water, dried and calcined to yield the finely powdered spinel oxide. The purpose of the washing treatment is to adjust the "water immersion pH value" of 10–11 of the spinel metal oxide powder before the washing treatment to a pH value of 7–9. The "water immersion pH value" mentioned here means the pH value of a suspension obtained by suspending the powder in distilled water in an amount of 1.5 times by weight of the powder, and agitating the resulting slurry for 20–30 minutes. A "water immersion pH of 7–9" implies that the powder in the solution is nearly neutral.

When a slurry of an alumina sol stabilized with an inorganic or organic acid is prepared with a spinel metal oxide powder not having been washed, the viscosity of the resulting spinel slurry is not stable because of the basic property of the fine powder and because the film of the spinel metal oxide formed on the carrier surface is not uniform. For this reason, the adjustment of the water immersion pH value by the washing treatment is an important step in the catalyst manufacturing procedure. When aluminum nitrate is added to the slurry thus obtained, it is possible to properly adjust the viscosity of the slurry and at the same time improve the adherence of the spinel metal oxide film on the underlying carrier.

In the preparation of the coated catalyst carrier, a carrier, particularly a monolithic carrier, is immersed in the spinel oxide slurry and then is removed from the slurry. Thereafter, residual slurry filling the pores of the carrier is forcibly removed by a stream of air, thereby resulting in a carrier coated with a spinel metal oxide on its surface. The coated carrier is dried at ambient temperature to 150° C. and calcined at 300°–1400° C., desirably at 400°–800° C. The process of immersion, drying and calcination may be repeated two or more times until the desired thickness of spinel metal oxide film is achieved on the carrier surface. However, as mentioned above it is desirable to maintain the amount of spinel metal oxide in the film at more than 90 weight % and the amount of alumina in the film at less than 10 weight %. After the coated carrier is prepared, it is immersed in an aqueous solution containing a water soluble form of either platinum or palladium or a combination thereof, optionally containing a water soluble cerium salt, followed by calcination in an oxidizing atmosphere or an inert atmosphere such as nitrogen gas or in a reducing atmosphere such as hydrogen gas, to yield a catalyst within the scope of the present invention. When cerium is supported on the surface of the spinel metal oxide film, cerium, which can be in the form of various oxides such as $CeO_2$ or $Ce_2O_3$, facilitates removal and absorption of oxygen on the carrier surface. Thus, cerium containing catalysts are effective for efficiently purifying exhaust gases by removing such harmful components as CO, HC and NOx.

Suitable catalyst carriers useful in the present invention can be in a granular, monolithic or the like form. Suitable carrier materials for monolithic carriers include cordierite, mullite, α-alumina, magnesia, silicon carbide, silicon nitride and the like.

The alumina sol used in 5–20 weight % concentration in the present invention can be any amorphous, fibrous colloidal alumina obtained by, for example, the process disclosed in Japanese Patent Publication No. Sho 40-3658, which has been stabilized with an inorganic or organic acid. Suitable organic acids such as acetic acid, formic acid, lactic acid, butyric acid and the like and suitable inorganic acids such as nitric acid, hydrochloric acid and the like or mixtures thereof can be employed for stabilization of the sol.

The amounts of platinum and/or palladium, and cerium, if desired, deposited on the coated carriers should be as follows:

Ce, 0.01–2.0 mol/l, preferably 0.1–0.6 mol/l; Pt or Pd, each 0.01–5.0 g/l, preferably 0.5–3.0 g/l; the total amount of Pt and Pd used in admixture, 0.01–5.0 g/l, preferably 0.5–3.0 g/l.

Having generally described this invention, a further understanding can be obtained by reference to certain specific examples which are provided herein for purposes of illustration only and are not intended to be limiting unless otherwise specified.

EXAMPLE 1

In a small V-form mixer, 300 g of nickel oxide with an average particle size of 4μ and 410 g of alumina with an average particle size of 10μ were mixed. The mixture was placed in a crucible for calcination in an electric furnace at 1400° C. for 20 hours. After cooling, the calcined product was washed with 1 l of 0.1 N solution of nitric acid, followed by washing with 2 l of distilled water. Then the washed product was calcined at 300° C. for 12 hours. The calcined product was dry-crushed in a ball mill made of alumina, yielding a spinel metal oxide of an average particle size of 6μ. Next, 250 g of distilled water was added to 300 g of alumina sol, containing 10 weight % of alumina which had been stabilized with acetic acid, to which 45 g of $Al(NO_3)_3.9H_2O$ was added yielding a mixed solution. To this solution was added 500 g of the spinel metal oxide with an average particle size of 6μ to prepare a spinel slurry, the viscosity of the slurry being 250 cps. A monolithic cordierite carrier (a cylinder of 93 mm in diameter and 76 mm in length) was immersed into the slurry for 120 seconds, removed from the slurry and then blasted with a stream of air to remove residual slurry filling the pores of the carrier. Thereafter, the carrier was dried at 150° C. for 3 hours and then calcined at 600° C. for 3 hours. The total amount of coated oxide was 50 g and the content of $NiAl_2O_4$ in the coating was 93% and that of alumina was 7%. The obtained carrier was immersed in 500 cc of an aqueous solution of chloroplatinic acid (containing 0.8 g of Pt) at room temperature for 30 minutes. After the carrier was lifted from the solution, residual drops of the solution in the pores of the carrier were removed by a blast with a stream of air. Then the carrier was rapidly dried in a hot draft and reduced in a nitrogen atmosphere containing 5% hydrogen at 500° C. for 3 hrs. This operation was repeated two times. The amount of Pt deposited on the carrier was 0.76 g.

EXAMPLE 2

In a small V-form mixer 160 g of magnesium oxide with an average particle size of 4μ and 410 g of alumina with an average particle size of 10μ were mixed. The mixture was placed in a crucible and calcined in an electric furnace at 1400° C. for 20 hours. The calcined product was washed with nitric acid in the same way as described in Example No. 1 and a slurry was prepared. A monolithic carrier coated with 50 g of metal oxide, the content of which coating in the form of $MgAl_2O_4$ was 93% and that of alumina was 7%, was obtained. The obtained carrier was immersed in 500 cc of a solution of palladium nitrate (Pd content 1.33 g) for 30 minutes. After being lifted from the solution, residual drops of the solution in the pores of the carrier were removed by a blast of air. The carrier was dried at 150° C. for 3 hours and then calcined at 500° C. for 2 hours. After cooling, the Pd-supporting carrier was immersed at room temperature into 500 cc of an aqueous solution of chloroplatinic acid (Pt content 0.45 g) for 30 minutes. After removal from the solution, drops of the solution in the cells were removed by a blast of air. Then, the carrier was rapidly dried in a hot draft of 150° C., reduced in a nitrogen atmosphere containing 5% hydrogen at 500° C. for 3 hours; and thereafter calcined at 500° C. for 2 hours. The amounts of Pd and Pt supported on the carrier were 0.53 g and 0.23 g, respectively.

EXAMPLE 3

In a small V-form mixer, 300 g of cobalt oxide with an average particle size of $3\mu$ and 410 g of alumina with an average particle size of $10\mu$ were mixed. The mixture was placed in a crucible and calcined in an electric furnace at 1400° C. for 20 hours. In the same way as described in Example No. 1, the calcined product was treated with acetic acid. A slurry was prepared from the washed product, which was then coated on a monolithic carrier. Tha amount of oxide coated on the monolithic carrier was 50 g. The $CoAl_2O_4$ content in the coating was 93% and that of alumina was 7%. The obtained carrier was immersed into 500 cc of an aqueous solution of cobalt nitrate (containing 1.8 mol of Co) for 10 minutes. After removal from the solution, residual drops of the solution in the pores of the carrier were removed by a blast of air. The carrier was dried at 150° C. for 3 hours and then calcined at 500° C. for 2 hours.

After cooling, the carrier on which cobalt oxide material was supported was immersed into 500 cc of a solution of palladium nitrate (containing 1.9 g of Pd). After removal from the solution, residual drops of the solution were removed by a blast of air. The carrier was then dried at 150° C. for 3 hours and calcined at 500° C. for 2 hours. The amounts of Co and Pd in the coating on the carrier were 0.1 mol and 0.76 g respectively.

EXAMPLE 4

In a small V-form mixer 300 g of cobalt oxide with an average particle size of $4\mu$ and 410 g of alumina with an average particle size of $10\mu$ were mixed. The mixture was placed in a crucible and calcined in an electric furnace at 1400° C. for 20 hours. After cooling, the calcined product was treated with 1l of 0.1 N solution of nitric acid and further washed with 2l of distilled water, followed by calcination at 300° C. for 12 hours. The calcined product was dry-crushed in a ball mill made of alumina yielding a metal oxide spinel having an average particle size of $6\mu$. Next, 250 g of distilled water was added to 300 g of alumina sol containing 10 weight % of alumina which was stabilized with acetic acid and the resultant mixture was mixed with $Al(NO_3)_3.9H_2O$ yielding a mixed solution. To this solution was added 500 g of the spinel metal oxide powder with an average particle size of $6\mu$, thereby yielding a spinel slurry having a viscosity of 250 cps.

Into this slurry was immersed a monolithic cordierite carrier for 120 seconds. After removal from the slurry, the slurry in the cells was removed by a blast of air. The carrier was dried at 150° C. for 3 hours and calcined at 600° C. for 3 hours. The amount of $CoAl_2O_4$ in the coating was 93 weight % while the amount of alumina was 7%. The carrier was then immersed in an aqueous solution of cerium nitrate (containing 1.8 mols of Ce) for 30 minutes. Residual drops of the solution in the pores of the carrier were removed by a blast of air after removal of the carrier from the solution. The carrier was dried at 150° C. for 3 hours and calcined at 500° C. for 2 hours, followed by immersion in 500 cc of an aqueous solution of chloroplatinic acid (containing 1.5 g of Pt) for 30 minutes. After residual drops of the solution in the pores of the carrier were removed by a blast of air, the carrier was rapidly dried in a hot draft of 150° C. and then reduced in a nitrogen atmosphere of 500° C. containing 5% hydrogen for 3 hours. The amounts of Ce and Pt supported on the carrier were 0.1 mol and 0.76 g respectively.

EXAMPLE 5

In a small V-form mixer 160 g of magnesium oxide with an average particle size of $4\mu$ and 410 g of alumina with an average particle size of $10\mu$ were mixed. The mixture was placed in a crucible and calcined at 1400° C. for 20 hours. The calcined product was treated with nitric acid in the same way as described in Example No. 4, and a slurry was prepared. A monolithic carrier was coated with this slurry, and the coating (50 g) had a $MgAl_2O_4$ content of 93% and an alumina content of 7%. The obtained carrier was immersed in 500 cc of an aqueous solution of cerium nitrate (containing Ce 1.8 mols) for 30 minutes. The carrier on which cerium was supported was immersed in 500 cc of a solution containing chloroplatinic acid and palladium chloride (containing 0.46 g of Pt and 1.06 g of Pd) for 30 minutes. Residual drops of solution in the pores of the carrier were removed by a blast of air. The carrier was rapidly dried in a hot draft of 150° C., reduced in a nitrogen atmosphere containing 5% hydrogen at 500° C. for 3 hours, and then calcined at 500° C. for 2 hours. The supported amounts of Ce, Pt and Pd were 0.1 mol, 0.23 g and 0.53 g respectively.

EXAMPLE 6

In a small V-form mixer 320 g of copper oxide with an average particle size of $3\mu$ and 410 g of alumina with an average particle size of $10\mu$ were mixed. The mixture was placed in a crucible and calcined in an electric furnace at 1400° C. for 20 hours. The calcined product was treated with acetic acid in the same way as described in Example No. 1 and a slurry was prepared. A monolithic carrier was coated with this slurry. The amount of the coating was 50 g and the $CuAl_2O_4$ and alumina contents of the coating were 93% and 7% respectively. The carrier was immersed in 500 cc of an aqueous solution of cerium nitrate (containing 1.8 mols Ce) for 30 minutes.

After the carrier was removed from the solution and residual drops of solution were removed from the carrier by a blast of air, the carrier was dried at 150° C. for 3 hours and calcined at 500° C. for 2 hours. The catalyst carrying Ce thus obtained was immersed in 500 cc of an aqueous solution of palladium nitrate (containing Pd-1.9 g) for 30 minutes. After removal of the carrier from the solution and removal of residual solution from the pores of the carrier, the catalyst was dried at 150° C. for 3 hours and calcined at 500° C. for 2 hours. The amounts of Ce and Pd supported were 0.1 mol and 0.76 g respectively.

EXAMPLE 7

In the same manner described in Example No. 5 powdered $MgAl_2O_4$ was obtained after a washing treatment with nitric acid. Next, 300 g of distilled water was added to 360 g of hydrochloric acid stabilized alumina sol containing 10 weight % of alumina, followed by addition of 54 g of $Al(NO_3)_3.9H_2O$ to yield a mixed solution. To this solution was added 360 g of the spinel metal oxide powder of average particle size of $6\mu$ to prepare a slurry, the viscosity of said slurry being 200 cps. A monolithic cordierite carrier was immersed in the slurry for 120 seconds.

After removal of the carrier from solution and blasting of residual solution from the pores of the carrier, the carrier wad dried at 150° C. for 3 hours and calcined at 600° C. for 3 hours. The amount of coated oxide was 40 g, the content of which was 88% $MgAl_2O_4$ and 12% alumina. The carrier was then immersed in 500 cc of a mixed solution of chloroplatinic acid and palladium chloride (Pt-0.46 g and Pd-1.1 g) for 30 minutes. After removal of the carrier from solution and blasting of residual solution from the pores of the carrier, the carrier was rapidly dried in a hot draft of 150° C., reduced in a nitrogen atmosphere containing 5% hydrogen at 500° C. for 3 hours, and then calcined at 500° C. for 2 hours. The carrier on which Pt and Pd was carried was immersed in 500 cc of an aqueous solution of cerium nitrate (with Ce 1.8 mols) for 30 minutes. After removal of the carrier from solution and blasting of residual drops of solution from the carrier with air, the carrier was dried at 150° C. for 3 hours and calcined at 500° C. for 2 hours. The carrier supported amounts of Ce, Pt and Pd of 0.1 mol, 0.23 g and 0.55 g respectively.

EXAMPLE 8

In a small V-form mixer, 420 g of strontium oxide (SrO) with an average particle size of 4μ and 410 g of alumina with an average particle size of 10μ were mixed. The mixture was placed in a crucible and calcined in an electric furnace at 1400° C. for 20 hours. The calcined product was treated with nitric acid in the same way as described in Example No. 1, to prepare a slurry. A monolithic carrier was coated with this slurry, the coated amount being 50 g which consisted of 93% $SrAl_2O_4$ and 7% alumina. The carrier was immersed in 500 cc of an aqueous solution of cerium nitrate (Ce-1.8 mols) for 30 minutes. The carrier supporting Ce was immersed in 500 cc of a mixed solution of chloroplatinic acid and palladium chloride (Pt-0.46 g and Pd 1.06 g) for 30 minutes. After the carrier was removed from solution and residual drops of solution were removed from the pores of the carrier by air blasting, the carrier was rapidly dried in a hot draft of 150° C., reduced in a nitrogen atmosphere containing 5% hydrogen at 500° C. for 3 hours, and then calcined at 500° C. in the air for 2 hours. The supported amounts of Ce, Pt and Pd on the carrier were 0.1 mol, 0.22 g and 0.53 g, respectively.

EXAMPLE 9

Using 290 g of manganese oxide (MnO) with an average particle size of 5μ, a monolithic carrier was coated with $MnAl_2O_4$ in the same way as described in Example No. 8. The supported amounts of Ce, Pt and Pd were 0.1 mol, 0.25 g and 0.52 g, respectively.

EXAMPLE 10

Using 520 g of molybdenum oxide ($MoO_2$) with an average particle size of 5μ, a monolithic carrier was coated with $MoAl_2O_4$ in the same as described in Example No. 8. The supported amounts of Ce, Pt and Pd were 0.1 mol, 0.20 g and 0.55 g, respectively.

EXAMPLE 11

Using 330 g of zinc oxide (ZnO) with an average particle size of 5μ, a monolithic carrier was coated with $ZnAl_2O_4$ in the same way as described in Example No. 8. The supported amounts of Ce, Pt and Pd were 0.1 mol, 0.24 g and 0.50 g, respectively.

EXAMPLE 12

Using 290 g of iron oxide (FeO) with an average particle size of 5μ, a monolithic carrier was coated with $FeAl_2O_4$ in the same way as described in Example No. 8. The supported amounts of Ce, Pt and Pd were 0.1 mol, 0.25 g and 0.53 g, respectively.

CONTROL 1

A 250 g amount of distilled water was added to 300 g of acetic acid-stabilized alumina sol containing 10 weight % of alumina, followed by successive addition of 45 g of $Al(NO_3)_3.9H_2O$ and 500 g of γ-alumina of average particle size of 10μ, to prepare a slurry, the viscosity of said slurry being 200 cps. A monolithic cordierite carrier was immersed in this slurry for 120 seconds. After removal of the carrier from solution and removal of residual slurry from the pores of the carrier by air blasting, the carrier was dried at 150° C. for 3 hours and calcined at 600° C. for 3 hours. The coated amount of alumina was 50 g. The carrier was then immersed in 500 cc of an aqueous solution of chloroplatinic acid (containing Pt 0.95 g) for 30 minutes at room temperature. After removal of the carrier from solution and removal of residual drops of solution from the pores of the carrier by air blasting, the carrier was rapidly dried in a hot draft of 150° C. and calcined in a nitrogen atmosphere containing 5% hydrogen at 500° C. for 3 hours. The supported amount of Pt was 0.76 g.

CONTROL 2

In the same way as described in control No. 1, an alumina film was formed on a monolithic carrier of cordierite, the amount of alumina therein being 50 g. This carrier was immersed in 500 cc of palladium nitrate (containing 0.67 g of Pd) at room temperature for 30 minutes. After removal of the carrier from the slurry and removal of excess solution from the carrier by air blasting, the carrier was dried at 150° C. for 3 hours and calcined at 500° C. for 2 hours. The carrier supporting Pd was immersed in 500 cc of aqueous solution of chloroplatinic acid (containing 0.29 g of Pt) for 30 minutes. After removal of the carrier from solution and removal of residual solution from the carrier by air blasting, the carrier was rapidly dried in a hot draft of 150° C., reduced in a nitrogen atmosphere containing 5% hydrogen at 500° C. for 3 hours, and then calcined in an electric furnace at 500° C. for 2 hours. The supported amounts of Pd and Pt were 0.53 g and 0.23 g, respectively.

CONTROL 3

In the same way as described in control No. 1, a monolithic cordierite carrier was coated with an alumina film. The amount of coated alumina was 50 g. This carrier was immersed in 500 cc of an aqueous solution of cobalt nitrate (containing 1.1 mols of Co). After removal of the carrier from the solution and removal of excess solution from the pores of the carrier by air blasting, the carrier was dried at 150° C. for 3 hours and calcined at 500° C. for 2 hours. The carrier supporting Co was immersed in 500 cc of a solution of palladium nitrate (containing Pd 0.96 g) for 30 minutes. After removal of the carrier from the solution and removal of excess solution from the pores of the carrier by air blasting, the carrier was dried at 150° C. for 3 hours and calcined at 500° C. for 2 hours. The supported amounts of Co and Pd were 0.1 mol and 0.76 g, respectively.

CONTROL 4

In the same way as described in Control No. 1, a monolithic carrier of cordierite was coated with an alumina film, the amount of which was 50 g. This carrier was immersed in 500 cc of an aqueous solution of cerium nitrate (containing 1.0 mol of Ce) for 30 minutes. After removal of the carrier from the solution and removal of excess solution in the pores of the carrier by air blasting, the carrier was dried at 150° C. for 3 hours and calcined at 500° C. for 2 hours. The carrier supporting Ce was immersed in 500 cc of an aqueous solution of chloroplatinic acid (containing 0.95 g of Pt) for 30 minutes. After removal of the carrier from the solution and removal of excess solution from the pores of the carrier by air blasting, the carrier was rapidly dried in a hot draft of 150° C. and then calcined in a reducing atmosphere of nitrogen containing 5% hydrogen at 500° C. for 3 hours. The supported amounts of Ce ant Pt were 0.1 mol and 0.76 g, respectively.

CONTROL 5

In the same way as described in Control No. 1, a monolithic cordierite carrier was coated with an alumina film, the amount of which was 50 g. This carrier was immersed in an aqueous solution of cerium nitrate (containing 1.0 mol of Ce) for 30 minutes. After removal of the carrier from solution and removal of excess solution from the pores of the carrier by air blasting, the carrier was dried at 150° C. for 3 hours and then calcined at 500° C. for 2 hours. The carrier supporting Ce was immersed in 500 cc of an aqueous solution of rhodium chloride (containing 0.09 g of Rh) for 30 minutes. After removal of the carrier from solution and removal of excess solution from the pores of the carrier by air blasting, the carrier was dried at 150° C. for 3 hours and then calcined at 500° C. for 2 hours.

The carrier supporting Ce and Rh was immersed in 500 cc of an aqueous solution of chloroplatinic acid (containing 0.86 g of Pt). After removal of the carrier from solution and removal of excess solution from the pores of the carrier by air blasting, the carrier was rapidly dried in a hot draft of 150° C., reduced in a nitrogen atmosphere containing 5% hydrogen at 500° C. for 3 hours, and then calcined at 500° C. for 2 hours. The supported amounts of Ce, Pt and Rh were 0.1 mol, 0.69 g, and 0.07 g, respectively.

CONTROL 6

In the same way as described in Control No. 1, a monolithic cordierite carrier was coated with an alumina film, the amount of which was 50 g. This carrier was immersed in 500 cc of an aqueous solution of cerium nitrate (containing 1.0 mol of Ce) for 30 minutes. After removal of the carrier from the solution and removal of excess solution from the pores of the carrier by air blasting, the carrier was dried at 150° C. for 3 hours and calcined at 500° C. for 2 hours. The carrier supporting Ce was immersed in 500 cc of a mixed solution of chloroplatinic acid and palladium chloride (containing 0.29 g of Pt and 0.66 g of Pd) for 30 minutes. After removal of the carrier from solution and removal of excess drops of solution from the pores of the carrier by air blasting, the carrier was rapidly dried in a hot draft of 150° C., reduced in a nitrogen atmosphere containing 5% hydrogen at 500° C. for 3 hours, and then calcined at 500° C. for 2 hours. The supported amounts of Ce, Pt and Pd were 0.1 mol, 0.23 g and 0.53 g, respectively.

The catalysts for purifying exhaust gas obtained in the above examples and controls were submitted to tests for durability and purifying rate.

1. DURABILITY TEST

Each catalyst was charged into a cylinder of stainless steel which served as an auto converter. The engine used had 6-cylinders (2000 cc). This converter was connected to the exhaust pipe. The conditions were set as follows:

(1) engine speed—2000 rpm;
(2) manifold vacuum—240 mm Hg;
(3) average ratio, A/F, 14.53; and
(4) catalyst bed temperature, 650°–750° C.

The fuel was commercial clear gasoline. Under these conditions the engine was run for 200 hours.

2. PURIFYING RATE TEST

The purifying rate was measured using the same 6-cylinder, 2000 cc engine under the specified conditions. The converter gas temperature was 400° C. and the A/F was variable. The exhaust gas was analyzed using NDIR (non-disperse infrared spectrometer) for CO, an FID (flame ionization detector) for HC and a chemiluminescence meter for NOx.

The results of the measurements are shown in Table 1.

TABLE 1

| Example Nos. | Initial purifying rate (%) | | | Purifying rate after durability test (%) | | |
|---|---|---|---|---|---|---|
| | CO | HC | NOx | CO | HC | NOx |
| 1. | 96 | 94 | 94 | 93 | 90 | 91 |
| 2. | 97 | 94 | 95 | 94 | 91 | 92 |
| 3. | 96 | 92 | 93 | 92 | 89 | 89 |
| 4. | 96 | 94 | 94 | 94 | 92 | 91 |
| 5. | 97 | 95 | 95 | 95 | 93 | 92 |
| 6. | 96 | 94 | 93 | 93 | 91 | 90 |
| 7. | 94 | 93 | 93 | 92 | 91 | 90 |
| 8. | 96 | 95 | 94 | 94 | 91 | 90 |
| 9. | 96 | 94 | 94 | 93 | 91 | 91 |
| 10. | 97 | 96 | 95 | 95 | 92 | 92 |
| 11. | 95 | 93 | 93 | 93 | 90 | 91 |
| 12. | 96 | 95 | 94 | 93 | 92 | 90 |

| Control Nos. | Initial purifying rate (%) | | | Purifying rate After durability test (%) | | |
|---|---|---|---|---|---|---|
| | CO | HC | NOx | CO | HC | NOx |
| 1. | 94 | 92 | 92 | 88 | 82 | 62 |
| 2. | 96 | 93 | 92 | 90 | 87 | 70 |
| 3. | 95 | 91 | 90 | 90 | 84 | 60 |
| 4. | 94 | 93 | 92 | 90 | 85 | 70 |
| 5. | 96 | 94 | 94 | 93 | 91 | 90 |
| 6. | 94 | 93 | 92 | 91 | 90 | 78 |

Examination of the results shows that the purifying rate of the catalysts obtained using $MAl_2O_4$ in Examples No. 1–12 (wherein M is Ni in example No. 1; Mg in Nos. 2, 5, 7; Co in Nos. 3,4; Cu in No. 6; Sr in No. 8; Mn in No. 9; Mo in No. 10; Zn in No. 11; and Fe in No. 12) decreased very little even after the testing, whereas the purification rate of the control examples Nos. 1–6 decreased significantly, particularly the purification rate of NOx. It should be noted that the purifying rates in Table 1 are referenced to an A/F ratio of 14.53.

It has been experimentally verified that the catalyst of the present invention can efficiently eliminate the harmful components of CO, HC and Nox in the exhaust gas, over a wide range of A/F values.

The range of A/F values at which over 60% of the harmful components can be eliminated is represented by $\overline{AB}$ in the Figure. This is a measure of the extent to which CO and HC on the rich side and NOx on the lean side of exhaust gas can be eliminated. The range $\overline{AB}$ before and after the durability test of the catalysts obtained in the examples and controls has been measured, the results being summarized in Table 2.

TABLE 2

| Examples Nos. | Initial A/F range | A/F range after durability test |
|---|---|---|
| 1. | 0.42 | 0.35 |
| 2. | 0.44 | 0.36 |
| 3. | 0.41 | 0.32 |
| 4. | 0.44 | 0.36 |
| 5. | 0.45 | 0.37 |
| 6. | 0.43 | 0.33 |
| 7. | 0.42 | 0.35 |
| 8. | 0.44 | 0.33 |
| 9. | 0.43 | 0.36 |
| 10. | 0.42 | 0.31 |
| 11. | 0.42 | 0.33 |
| 12. | 0.41 | 0.32 |
| Control Nos. | | |
| 1. | 0.33 | 0.08 |
| 2. | 0.34 | 0.12 |
| 3. | 0.30 | 0.07 |
| 4. | 0.35 | 0.14 |
| 5. | 0.37 | 0.33 |
| 6. | 0.35 | 0.26 |

Examination of the results shows that the A/F ranges for the catalysts in Examples Nos. 1–12 are far wider even after the tests than are the ranges for control examples Nos. 1–6. This means that the catalysts of the present invention exhibit excellent purification of the exhaust gases, because they can efficiently eliminate CO, HC and NOx even if the exhaust gas turns rich or lean. Moreover, the catalysts of the present invention exhibit high levels of purification efficiency over long periods of time.

Having now fully described the invention, it will be apparent to one or ordinary skill in the are that many changes and modifications can be made thereto without departing from the spirit or scope of the invention as set forth herein.

What is claimed:

1. A catalyst for the purification of exhaust gases, comprising:
an active component of Pt, Pd or mixture thereof and cerium deposited on a catalyst support of a carrier coated with a metal oxide having a spinel structure of the formula: $MAl_2O_4$ wherein M is Cu, Mn, Mo, Zn, Fe, Co, Ni or Sr.

2. The catalyst of claim 1, wherein the supported amount of either Pt or Pd is 0.01–5.0 g/l.

3. The catalyst of claim 2, wherein the supported amount of either Pt or Pd is 0.5–3.0 g/l.

4. The catalyst of claim 1, wherein the combined amount of Pt and Pd supported on the carrier is 0.01–5.0 g/l.

5. The catalyst of claim 4, wherein the combined amount of Pt and Pd supported on the carrier is 0.5–3.0 g/l.

6. The catalyst of claim 1, wherein the supported amount of Ce is 0.1–2.0 mol/l.

7. The catalyst of claim 6, wherein the supported amount of Ce is 0.1–0.6 mol/l.

8. The catalyst of claim 1, wherein the oxide coating on the catalyst carrier contains said spinel metal oxide component and an oxide of Al, Sr, Mg, Cu, Mn, Mo, Zn, Fe, Co or Ni.

9. The catalyst of claim 8, wherein the spinel metal oxide accounts for more than 90 weight % of the total coating.

10. The catalyst of claim 8, wherein the metal M oxide component accounts for less than 10 weight % of the total coating.

11. A method of preparing an exhaust gas purification catalyst comprising:
treating a fine powder spinel metal oxide of the formula: $MAl_2O_4$ wherein M is Sr, Mg, Cu, Mn, Mo, Zn, Fe, Co or Ni with an inorganic or organic acid; and washing said treated spinel oxide with water-rimmersing a catalyst carrier in a slurry consisting of said treated spinel oxide and an alumina sol stabilized with an inorganic or organic acid, thereby forming a film of the spinel metal oxide on the surface of said carrier; drying and calcining said coated carrier thereby forming a thin-coating of said film on said carrier; immersing said coated carrier in a solution containing a soluble form of Pt, Pd or mixture thereof; and calcining or reducing said noble metal coated carrier.

12. The process of claim 11, wherein said finely powdered spinel metal oxide has an average particle size of 0.5–25μ.

13. The process of claim 11, wherein said noble metal coated carrier is immersed in a solution containing cerium ions.

14. The process of claim 11, wherein said spinel metal oxide has a water immersion PH value of 7 to 9.

15. The process of claim 11, wherein said spinel metal oxide coated carrier is immersed in a solution containing cerium ion.

* * * * *

UNITED STATES PATENT AND TRADEMARK OFFICE
CERTIFICATE OF CORRECTION

PATENT NO. : 4,261,862
DATED : April 14, 1981
INVENTOR(S) : HIROO KINOSHITA

It is certified that error appears in the above—identified patent and that said Letters Patent is hereby corrected as shown below:

Please correct the Inventor's Data to read as follows:

[75]--Inventor's Data
Hiroo Kinoshita; Yoshihiro Suzuki; Naomi Akasaka, all of Toyota, Japan           --rather than--

[75]--Inventor's Data
Hiroo Kinoshita; Yoshihiro Suzuki, both of Toyota, Japan as it now appears.

Signed and Sealed this

Seventh Day of July 1981

[SEAL]

*Attest:*

RENE D. TEGTMEYER

*Attesting Officer*   *Acting Commissioner of Patents and Trademarks*